April 15, 1930.  P. A. S. IVERSEN  1,754,858
MOTOR VEHICLE BRAKE
Filed Dec. 14, 1927
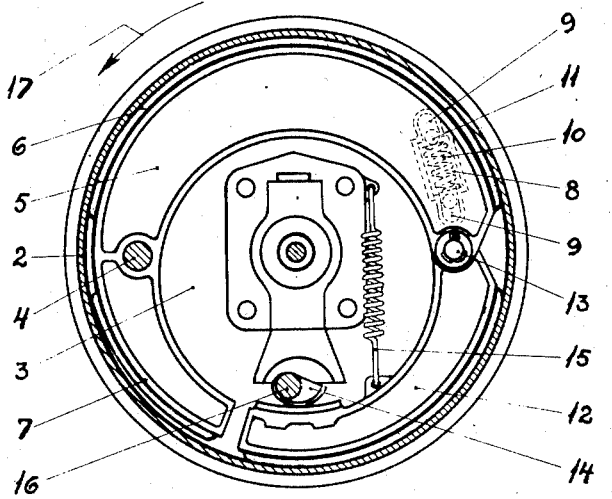
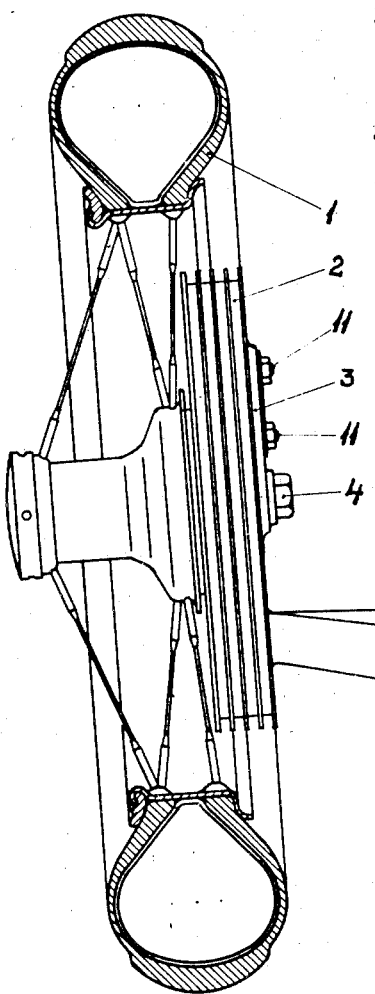
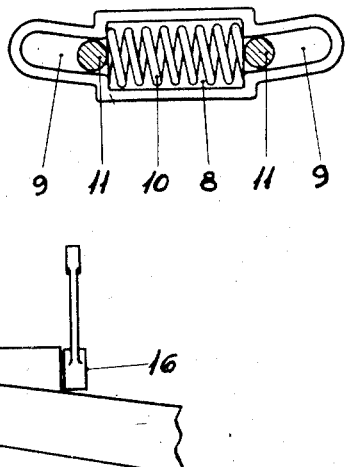
Inventor:
Poul Arne Scott Iversen
By
Attorney.

Patented Apr. 15, 1930

1,754,858

UNITED STATES PATENT OFFICE

POUL ARNE SCOTT IVERSEN, OF COPENHAGEN, DENMARK

MOTOR-VEHICLE BRAKE

Application filed December 14, 1927, Serial No. 239,993, and in Germany September 9, 1927.

This invention relates to motor vehicle brakes and has for its object to provide a brake which is particularly suited for cases in which the brake is required to act both when the vehicle is driven forward and when it is driven backward.

The invention provides for a simple, sound and effective construction of such a brake, requiring no links or similar unreliable devices for transmitting the braking forces.

The brake according to the present invention is characterized by the employment of a rotatably suspended brake block, having two braking faces eccentric with respect to one another, of which one is pressed against the brake drum when the vehicle is travelling forward and the other when it is travelling backward, when the brake has to be applied.

The invention furthermore comprises various adjusting and servo arrangements suitable for use with such a brake block, which will be described hereinafter.

In the accompanying drawing a front wheel brake according to the present invention is illustrated.

Fig. 1 shows the brake, partly in section, as seen from the wheel.

Fig. 2 is a detail of the brake, and

Fig. 3 is a front view of a brake mounted on a front wheel.

The brake comprises, as usual, a brake drum 2 mounted on a wheel 1 and closed towards the inside by a shield 3.

On a pin 4 fixed to the shield 3 a brake block 5 is pivoted. This brake block has two braking surfaces 6 and 7 which are eccentric to one another and of which the surface 6 brakes for driving forward (as shown in Fig. 1) and the surface 7 for driving backward, when forced against the inner surface of the drum 2.

In the side of the brake block 5 facing the shield 3 is a substantially rectangular main recess 8 terminating in two secondary recesses 9 having circular ends, the centers of which lie on an arc having the pin 4 as its center.

In the main recess 8 a helical spring 10 is housed, and into each of the secondary recesses 9 there extends an adjustable bolt 11 fixed to the shield 3.

The bolts 11 are so adjusted that, resting against the spring 10 without pressing on it, they hold the brake block 5, when unloaded, in its middle position, so that neither the braking surface 6 nor the braking surface 7 comes in contact with the drum 2. It will be seen therefore, that the spring 10 opposes rocking motions of the brake block 5 in either direction.

For operating the brake block 5 a servo-block 12 is provided, which is connected by a hinge 13 to the brake block proper 5.

The servo-block 12 is forced against the drum by a cam 14 which acts radially with respect to the drum.

A spring 15 of a known kind prevents the servo-block 12 from rattling when it is out of operation.

As will be seen from Fig. 3, the shaft 16 of the cam 14 can be extended to the outside in a simple manner for connecting it to the pull members leading from the driver's seat.

The brake operates as follows:

When driving forward, the drum 2 rotates in the direction of the arrow 17 in Fig. 1. When the brake is not applied, the spring 10 sets the brake block 5 in such a position that it does not make contact with the drum anywhere, the spring 15 keeping the block 12 away from the drum.

If the cam 14 be turned so that the servo-block 12 is forced against the drum, by which it is carried round by friction, the block 12 will displace the brake block proper 5 into the position shown in Fig. 1 and will press the braking surface 6 with great force against the drum 2, thus producing a strong braking action.

When the vehicle is travelling in the opposite direction and the servo-block is pressed against the drum, it will slide with the drum in the opposite direction to the arrow 17 drawing the block 5 along with it, so that the surface 7 will now be pressed against the drum and brake the latter.

What I claim as new is:

1. A motor vehicle brake comprising, in combination with a brake drum and a shield therefor, a brake block rotatably mounted within the drum on a stationary pivot and having two braking surfaces which are eccentric with respect to each other, said brake block also having a recess in it, a spring inserted in said recess, and two pins fixed on the drum shield and extending into said recess at either end of the said spring.

2. A motor vehicle brake comprising, in combination with a brake drum and a shield therefor, a main brake block rotatably mounted within the drum on a stationary pivot and having two braking surfaces which are eccentric with respect to each other, a servo-brake block in said drum hinged to the said brake block, and a cam acting in a radial direction with respect to the drum for pressing said servo-brake block against the drum.

3. A motor vehicle brake, comprising a brake drum, a single crescent-shaped main brake block within the drum rotatably mounted adjacent one end on a stationary pivot to provide two braking surfaces at opposite sides of the pivot which are eccentric to each other, and a servo-brake block hinged to the other end of the main brake block.

4. A motor vehicle brake, comprising a brake drum, a single crescent-shaped main brake block within the drum rotatably mounted adjacent one end on a stationary pivot to provide two braking surfaces at opposite sides of the pivot which are eccentric to each other, a servo-brake block hinged to the main brake block, and a cam operative directly on the servo-brake block to press it against the drum.

5. In a motor vehicle brake, a brake drum, and a single crescent-shaped brake block within the drum rotatably mounted adjacent one end on a stationary pivot to provide two braking surfaces at opposite sides of the pivot which are eccentric to each other.

In testimony whereof I affix my signature
POUL ARNE SCOTT IVERSEN.